US009327849B2

(12) United States Patent
Swanson

(10) Patent No.: US 9,327,849 B2
(45) Date of Patent: May 3, 2016

(54) CONTAINER ORIENTING HOLDER WITH ROLLER SUPPORTS AND A CONTAINER ORIENTING METHOD

(75) Inventor: John H. Swanson, Rutherford, NJ (US)

(73) Assignee: Colgate-Palmolive Company, New York, NY (US)

( * ) Notice: Subject to any disclaimer, the term of this patent is extended or adjusted under 35 U.S.C. 154(b) by 139 days.

(21) Appl. No.: 13/808,935

(22) PCT Filed: Jul. 8, 2010

(86) PCT No.: PCT/US2010/041293
§ 371 (c)(1),
(2), (4) Date: Jan. 8, 2013

(87) PCT Pub. No.: WO2012/005726
PCT Pub. Date: Jan. 12, 2012

(65) Prior Publication Data
US 2013/0105038 A1 May 2, 2013

(51) Int. Cl.
B65G 47/86 (2006.01)
B65B 1/04 (2006.01)
B65B 43/52 (2006.01)

(52) U.S. Cl.
CPC . B65B 1/04 (2013.01); B65B 43/52 (2013.01); B65G 2201/0261 (2013.01)

(58) Field of Classification Search
CPC ........ B65G 13/02; B65G 37/00; B65G 17/26; B65G 2201/0261; B65B 1/04; B65B 43/52; B65B 45/39; B65B 43/59; B65B 43/54; B23Q 1/03; B67C 3/00
USPC ........... 248/316.8, 311.2, 309.1, 310, 346.11, 248/316.2, 316.3, 523, 346.01; 198/803.7–803.9, 867.11, 867.12, 198/867.01–867.15; 141/165; 211/74–80
See application file for complete search history.

(56) References Cited

U.S. PATENT DOCUMENTS 1,798,028 A * 3/1931 Nachtigal ............. A47L 13/512
248/113
2,099,125 A * 11/1937 Langslow ................. A24F 9/14
131/260
2,956,687 A 10/1960 Robichaud
(Continued)

FOREIGN PATENT DOCUMENTS

EP 0 205 953 12/1986
EP 0727367 8/1996

OTHER PUBLICATIONS

International Search Report and Written Opinion issued in International Application No. PCT/US2010/041293 and mailed on Apr. 4, 2011.

Primary Examiner — Christopher Garft

(57) ABSTRACT

The invention primarily is directed to an orienting holder for a container that is being filled with a product on a container filling line. The container holder (10) has at least two rollers (18) and a base portion (12). The rollers are made of an elastic material which can be an elastomer inclusive of polymeric foams. The rollers are on arms (15, 16) that project above the base portion and usually will contact the container (30) at an upper part of the container. The arms which support the rollers can pivot. The elastic material of the rollers provide for a positive gripping of the container on the filling line, including a positive grip onto containers which may be partially out of the specified tolerances. The compressibility of the elastic material of the rollers can be enhanced through forming channels (27) in the roller structure.

32 Claims, 10 Drawing Sheets

(56) References Cited

U.S. PATENT DOCUMENTS

| | | | |
|---|---|---|---|
| 3,365,761 A | 1/1968 | Kalvig | |
| 3,868,010 A * | 2/1975 | Banyas | B23B 31/18 198/500 |
| 3,941,237 A | 3/1976 | MacGregor et al. | |
| 4,159,762 A | 7/1979 | Bulwith | |
| 4,533,038 A | 8/1985 | Richard | |
| 4,664,248 A | 5/1987 | Goodman, Jr. et al. | |
| 4,807,421 A | 2/1989 | Araki et al. | |
| 4,858,980 A | 8/1989 | Dreisig et al. | |
| 5,029,695 A | 7/1991 | Kovara | |
| 5,295,723 A | 3/1994 | Kronseder | |
| 5,373,618 A | 12/1994 | Doyle et al. | |
| 5,479,762 A * | 1/1996 | Bliss | B67B 3/20 53/317 |
| 5,484,052 A | 1/1996 | Pawloski et al. | |
| 5,704,579 A * | 1/1998 | Celentino | B60N 3/106 224/926 |
| 5,990,595 A * | 11/1999 | Crowell | H02K 17/165 310/211 |
| 5,992,811 A * | 11/1999 | McFerren | A01D 34/001 248/113 |
| 6,017,025 A | 1/2000 | Balz et al. | |
| 6,068,110 A | 5/2000 | Kumakiri et al. | |
| 6,176,369 B1 | 1/2001 | Petrovic | |
| 6,343,690 B1 * | 2/2002 | Britton | B65G 17/002 198/803.6 |
| 6,405,853 B1 | 6/2002 | Cook et al. | |
| 6,625,835 B1 * | 9/2003 | Frost | H01L 21/67034 134/902 |
| 6,971,506 B2 * | 12/2005 | Hassinen | G01N 21/67034 134/902 |
| 7,216,758 B2 | 5/2007 | Hartness et al. | |
| 7,445,129 B2 * | 11/2008 | Lin | B25H 3/04 211/60.1 |
| 7,717,253 B2 * | 5/2010 | Lord | B65G 17/44 15/77 |
| 8,459,462 B2 * | 6/2013 | Lavi | B07C 5/3412 209/3.3 |
| 2003/0106779 A1 * | 6/2003 | Stocchi | B65G 29/00 198/803.3 |
| 2007/0267096 A1 | 11/2007 | Uriel | |
| 2009/0272867 A1 * | 11/2009 | Tseng | H05K 5/0204 248/311.2 |

\* cited by examiner

CONTAINER ORIENTING HOLDER WITH ROLLER SUPPORTS AND A CONTAINER ORIENTING METHOD

CROSS-REFERENCE OF RELATED APPLICATIONS

This application is a U.S. national stage entry under 35 U.S.C. §371 of Patent Cooperation Treaty Patent Application No. PCT/US2010/041293, filed Jul. 8, 2010, the entirety of which is incorporated herein by reference.

BACKGROUND OF THE INVENTION

This invention relates to an orienting holder for containers that are being processed on an automated processing line. This invention also relates to a method of holding a container at a particular orientation on a container processing line. More particularly this invention relates to a holder that stabilizes and moves a container along a processing line, such as a filling line, and in addition holds the container in a preset orientation throughout processing. This will allow the container to be in the proper orientation with regard to applying a closure and for any subsequent operations.

Holders, such as pucks, are used in the manufacturing of a variety of products. However, a main use is in the filling and handling of containers. Many containers are filled with a product on an automated filling line. These filling lines operate at filling speeds of 50 to 300 containers per minute or more. The containers if substantially rectangular can move along the filling line without a holder by each container being stabilized by the trailing container. In order to maintain such containers in the proper orientation the containers will have bumping flats. These are flat areas on containers where the containers will be in contact, one to the other. This will prevent a "shingling" of the containers on the filling line. However, for containers of unstable, unique or decorative shapes, or for containers which are substantially circular in cross-section, a holder usually will be used. This particularly is the case where the container subsequent to the filling must be maintained in a particular orientation for applying a closure, labeling, case packing or for some other operation. A holder also will properly orient the container with regard to a filling line filling nozzle. This will prevent filling errors and spills on the filling line.

Pucks are a type of holders for containers and are available in various shapes and types. The type and shape will be dictated by the shape of the container being filled and the requirements of the filling line. In general pucks will have a base which is adapted to fit onto the filling line and an inner area for placement of the container. This inner area can be a recess within the puck into which the container will fit. The puck can have a surrounding wall that extends only around the base of the container or that substantially encloses the container. In addition the puck can be comprised of the base and only two upwardly extending arms to support the container. This type of puck is known as a "goal post" or a "labeling" puck. A variety of such pucks are available from suppliers such as Advantage Pucks Technologies of Corry, Pa.

Various container holders and container transfer devices are disclosed in the patent prior art. U.S. Pat. No. 4,159,762 discloses an article holder and transferring device. Here there is a plurality of holders with each holder having four gripper arms. The gripper arms will move toward a container located within a recess of the device to grip and hold the container as needed in an operation and will move away from the container to release the container. The gripper arms are disclosed as rods with attached plates. U.S. Pat. No. 4,807,421 discloses the holding of a container for processing using a plurality of extending flexible members. The flexible members can hold the container in a set orientation. In addition the flexible members can accept containers with some variation in the shape of the containers. U.S. Pat. No. 5,479,762 discloses carrier pucks for a container and for a closure for the container. The carrier puck for the container is sized to accommodate the container with no other particular features. The carrier puck for the closure has four gripper members that are secured to pivoting gripper arms. The gripper members are rollers which are comprised of a solid polymeric material such as polyurethane. These four gripper rollers rotate to secure the closure to the container. U.S. Pat. No. 6,068,110 discloses a holder for a cell that is being assembled. It consists of a rigid outer portion and an elastic inner portion to accommodate and hold the cell during its manufacture. There is no use of rollers.

Although these prior art documents disclose various structures for pucks and various holders, nevertheless there is still a need in the art for improved orienting holders for containers which are to be processed on a line such as a filling line. In particular, there is still a need for an orienting holder which can provide for the effective handling of containers on a filling line, and in particular containers of a unique shape such as those having a substantially circular cross-section.

The invention aims at least partially to solve the problem of reliably and securely holding the container in its initial set orientation with regard to its surface bearing the primary graphics while moving along the filling line and while a non-round closure is being attached, such as a closure having a combined pump dispenser.

There is also a need in the art for an orienting holder which can reliably and securely prevent the container from rotating while on the filling line, in particular in an application in which a spout of each successively attached pump dispenser of a series of containers will need to be in a set orientation with regard to the container graphics, and each container needs to have the spout of the attached pump dispenser in the same orientation for subsequent operations such as case packing.

Further, there is also a need in the art for an orienting holder which can provide uniformity of the container structure and labeling which in turn can provide for a neater product array when a number of identical products are displayed on a store shelf.

Also, there is a need in the art for an orienting holder which can provide the ability to quickly insert and to remove containers from the orienting holders and the filling line for case packing.

Finally, there is a need in the art for a low cost solution for improved round container handling on a processing line such as a filing line.

BRIEF SUMMARY OF THE INVENTION

Accordingly, the invention provides an orienting holder for holding a container in a desired orientation on a container processing line, the orienting holder comprising a unit having a base portion for supporting a container disposed thereon, a cavity for receiving a container and at least two rollers located around the cavity for engaging an exterior surface of a container received within the cavity, at least one of the rollers being located at a respective one of at least two positions located around the cavity.

The invention is directed to an orienting holder for containers. The unit is adapted to hold the container in an upright orientation when the base portion is horizontally oriented. This is a holder that in addition to moving a container along a processing line, such as a filling line, will in addition maintain the container in an initial set orientation during such processing. This orienting holder comprises a unit having at least two rollers, the unit having a base portion, the rollers being connected to the base portion and in contact with the container to be processed on its exterior surface, the rollers in one preferred embodiment being compressible material rollers.

The rollers are on arms attached to the base portion, and in another preferred embodiment contact the container at an upper part of the container. There are at least two arms with at least one roller on each arm. The arms optionally can flex or rotate whereby the rollers can move towards and away from the container. The arms, by flexing or rotating, can increase or decrease the contact pressure against the container.

The at least two positions located around the cavity may comprise positions on opposite sides of the cavity, and/or may comprise only two opposite positions. Typically, the at least two positions located around the cavity are positioned so that the rollers at least partly surrounding the cavity temporarily capture a container disposed therein. The rollers may be adapted to provide an inwardly and downwardly oriented holding force on a container disposed in the cavity. Optionally, there is a structure on the base portion adapted to interact with the container processing line. The structure defines forward and rearward ends of the unit, and the at least two positions located around the cavity may comprise positions on opposite sides of the unit, the sides extending between the forward and rearward ends.

The present invention also provides a container processing line comprising a series of orienting holders according to the present invention.

The present invention also provides a method of holding a container at a particular orientation on a container processing line, the method comprising the steps of: locating a container on a base portion mounted on a processing line and holding an exterior surface of a portion of the container between opposed rollers mounted above the base portion, the rollers holding the container at a particular orientation.

The rollers are comprised of elastic materials. The elastic materials of the rollers include elastomers. Elastomers are inclusive of polymeric foams. Polymeric foams are a type of a compressible material. In one embodiment the rollers have a plurality of channels to enhance the elasticity and/or the compressibility of the rollers. In another embodiment the rollers are of a continuous structure with no channels. In a further embodiment the rollers have a modified outer surface to enhance contact with the container. The elastomer can be a natural or a synthetic material such as natural or synthetic rubbers, a polymer or copolymer containing ethylene units, a polymer or copolymer containing propylene units or a polymer or copolymer containing butylene units. When a polymeric foam is used the elastomer can be a polyurethane foam, a polyethylene foam, an ethylene-vinyl acetate foam, or a polypropylene foam.

The rollers will have a stiffness factor of about 0.8N to about 80N per 4 mm deflection, and preferably about 3 to about 18N per 4 mm deflection. As a result rollers can be chosen from these ranges to suit the needs for a particular container. This increases the versatility of the holders which can then be used for various shaped containers.

The holder according to the preferred embodiments of the present orienting holder can provide for the effective handling of containers on a filling line, and in particular containers of a unique shape such as those having a substantially circular cross-section. It solves the problem of holding the container in its initial set orientation with regard to its surface bearing the primary graphics while moving along the filling line and while a non-round closure is being attached, such as a closure having a combined pump dispenser. The holders prevent the containers from rotating while on the filling line. Additionally, in many instances the spout of each pump dispenser will need to be in a set orientation with regard to the container graphics, and each container needs to have the spout of the attached pump dispenser in the same orientation for subsequent operations such as case packing. Further, it provides for a neater product array when displayed on a store shelf. Also provided is the ability to quickly insert and to remove containers from the orienting holders and the filling line for case packing.

These advantages and technical effects may all be accomplished by a holder having rollers in contact with the container surface. The rollers are comprised of an elastic material, and in one preferred embodiment, are comprised of a compressible elastic material. Elastic materials are those that can deform upon the application of a force, but which will upon the removing of the force substantially regain their original shape. Compressible materials are a type of elastic material which have a higher degree of deformation upon the application of a force but which will likewise substantially regain their original shape upon the removal of the force. The rollers by rotating will minimize the required inserting and removing forces, and by being in contact with the container will hold the container in an initial set orientation while on the filling line. The use of holders with rollers provides for these significant advantages over other holders. The use of compressible rollers provides for an enhancement of these advantages. These are low cost solutions for improved round container handling.

DETAILED DESCRIPTION OF THE INVENTION

The invention will now be described in its preferred embodiments with reference to the attached drawings. It is to be understood that the preferred embodiments disclose a concept for a novel holder that can be subject to modifications for adaption to specific environments and particular uses. All such modifications are deemed to be within the present concept.

Figure 1:
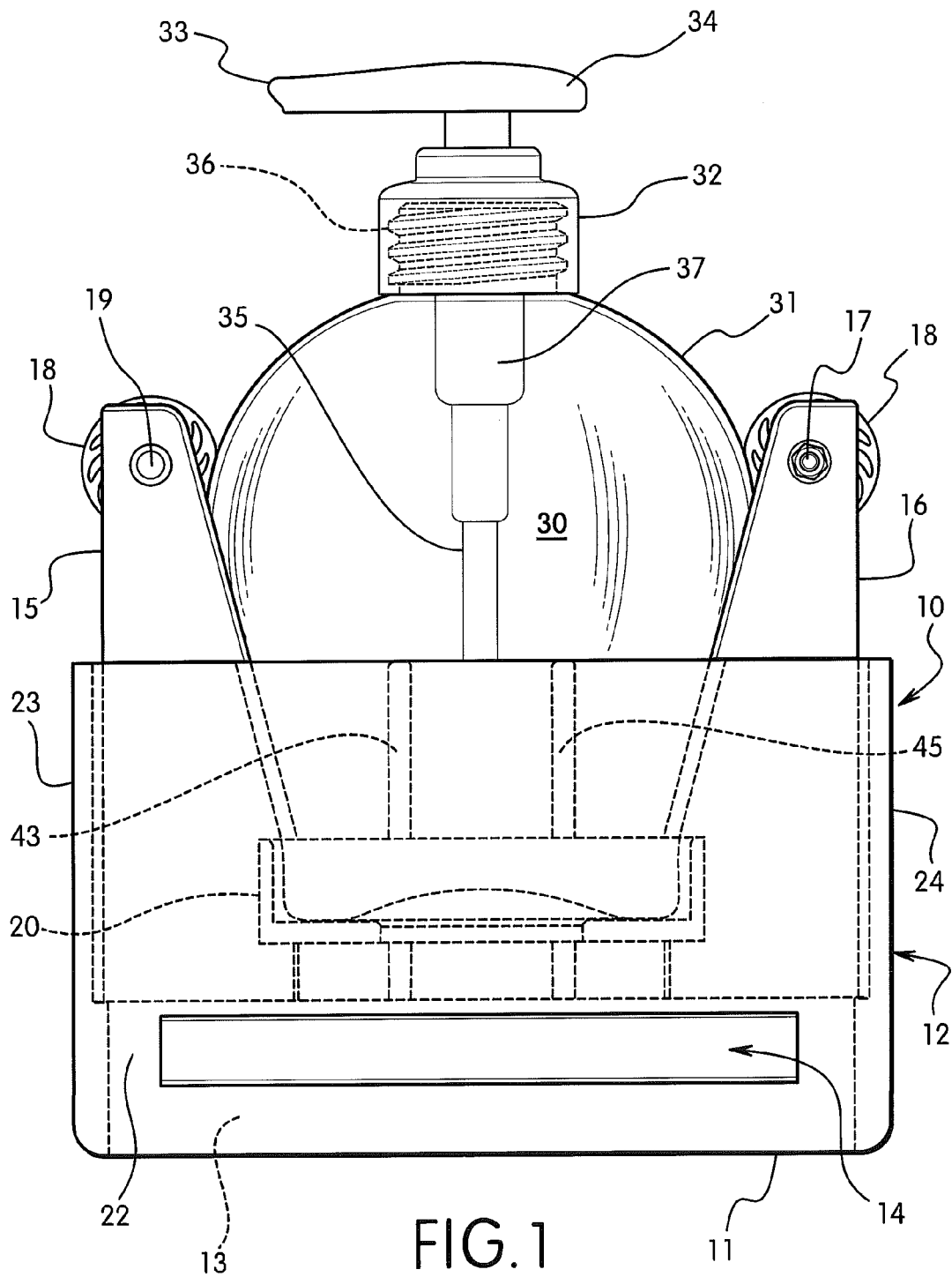
FIG. 1 is a front elevation view of an orienting holder according to a first embodiment of the present invention, the holder being shown in combination with a container, the base portion of the holder showing part of the inner structure of the holder.

FIG. 1 shows the orienting holder 10 in combination with a container in front elevation with part of the inner structure the base portion 12 of the holder 10 in dashed lines. The base portion 12 has a bottom surface 11. Shown are holder first side wall 23 and holder second side wall 24. Arm 15 is attached to the inner surface of first side wall 23 and arm 16 is attached to the inner surface of second side wall 24. Arm 15 supports a roller 18 and arm 16 supports another roller 18. Typically, the arms 15, 16 are rigid, or flexible, and the rollers 18 are compressible. Each roller 18 rotates on an axle 19 which has a fastener 17 to maintain the axle on its respective arms. Each roller 18 is mounted at a common height above the base portion 12. Shown as a part of the base portion 12 is a holder cup 20 and vertical supports 43 and 45. Also shown in a lower part 13 of the front wall 22 of the base portion 12 is a slot 14. The slot 14 interacts with a projection on a processing line to maintain the holder on the processing line. The processing line usually will be a filling line.

Also shown in this view is a container 30 supported in holder cup 20. The container is received in a cavity defined above the holder cup 20.

The container has an enclosing surface 31 and a closure 32. The closure 32 has an attached pump dispenser comprised of an actuator 34 with a spout 33, a pump body 37 and a dip tube 35. The product in the container 30 will exit the container through spout 33. The closure 32 is attached the neck of the container by mating threads 36 which are on both the closure and the container. Essentially any conventional pump dispenser can be used.

Figure 2:
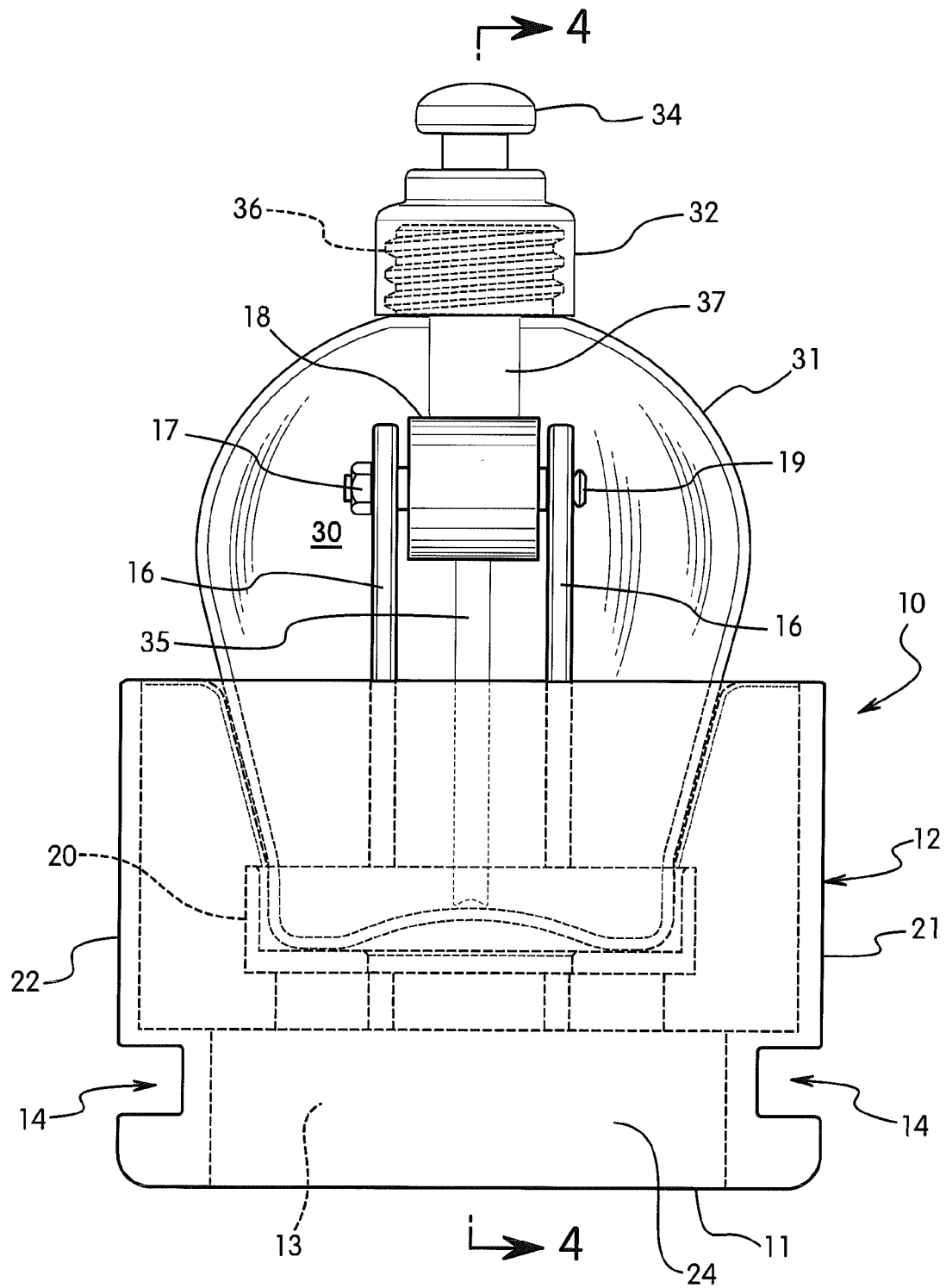
FIG. 2 is a right side elevation view of the holder of FIG. 1, the base portion showing part of the inner structure.

FIG. 2 is a right side elevation view of the base portion 12 with container 30 of FIG. 1. Shown is base portion front wall 22 and rear wall 21. The lower part 13 of the base portion 12 has slots 14 for interacting with a structure of the processing line. The container 30 is supported in holder cup 20. The roller 18 is supported within arm 16 which has two support parts for the axle 19. Another roller 18 is similarly supported by arm 15. Optionally the arms 15 and 16 can be of a one piece construction solely with an opening for the mounting of the rollers. The axles 19 with the rollers 18 are secured to arms 15 and 16 by fasteners 17. The container 30 has the same components as in FIG. 1 and will not be described with regard to this view.

Figure 3:
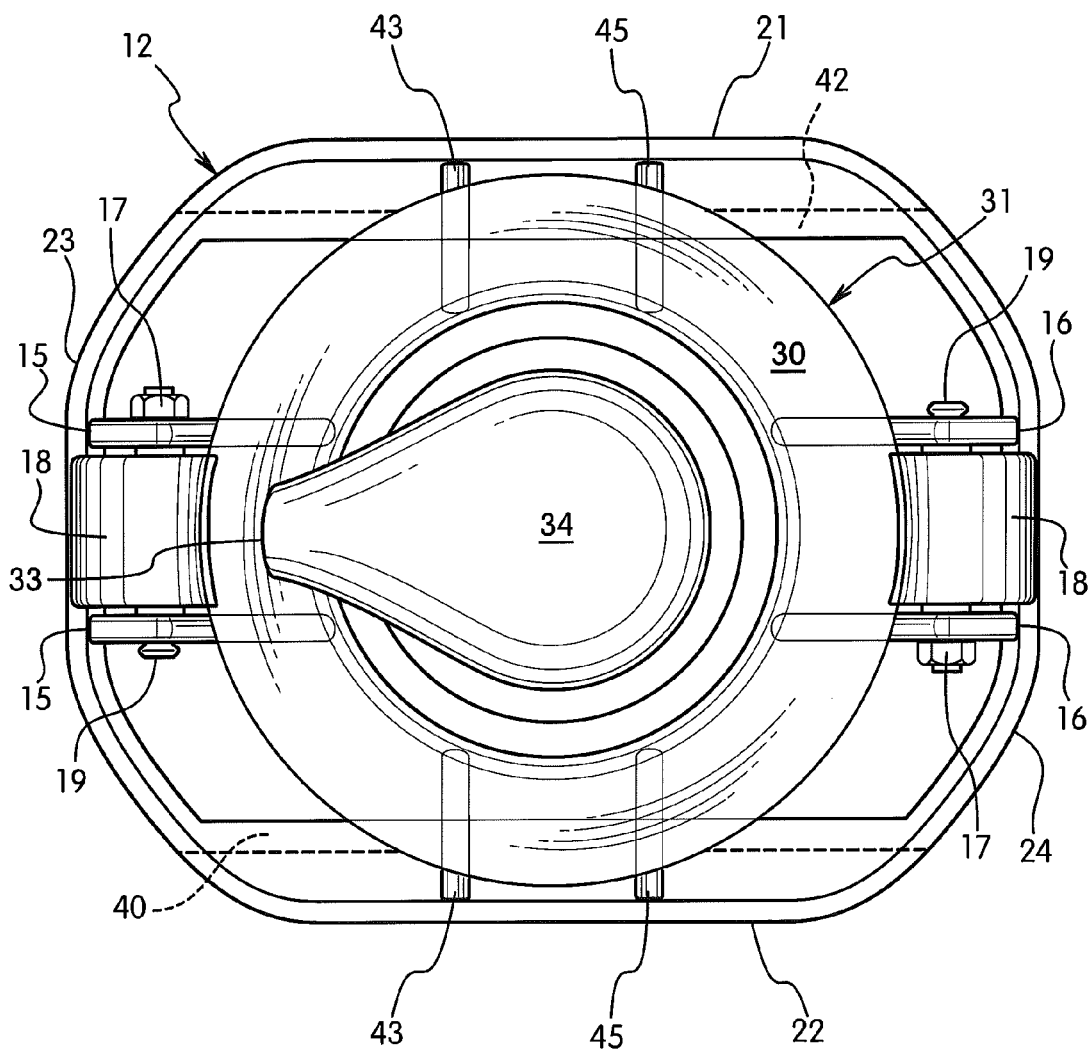
FIG. 3 is a top plan view of the holder of FIG. 1.

FIG. 3 is a top plan view of the holder 10 of FIG. 1. Shown is the base portion 12 with front wall 22, rear wall 21, first side wall 23 and second side wall 24. Vertical supports 43 and 45 reinforce each of the front and rear walls 22, 21. Arms 15 and 16 reinforce first side wall 23 and second side wall 24 respectively as well as serving as mounting structures for the rollers 18 when attached to these side walls 23, 24. As an alternative, the arms 15, 16 can be attached to the bottom wall 11 of the base portion 12. The rollers 18 are supported on arms 15 and 16 by their respective axles 19 and fasteners 17. Horizontal supports 40 and 42 disposed beneath the holder cup 20 and extending between the first side wall 23 and second side wall 24 provide support for lower parts of the vertical supports 43 and 45 which extend inwardly form the which in turn support the holder cup 20. The container 30 has the same components as in FIG. 1 and will not be described in detail with regard to this view.

Figure 4:
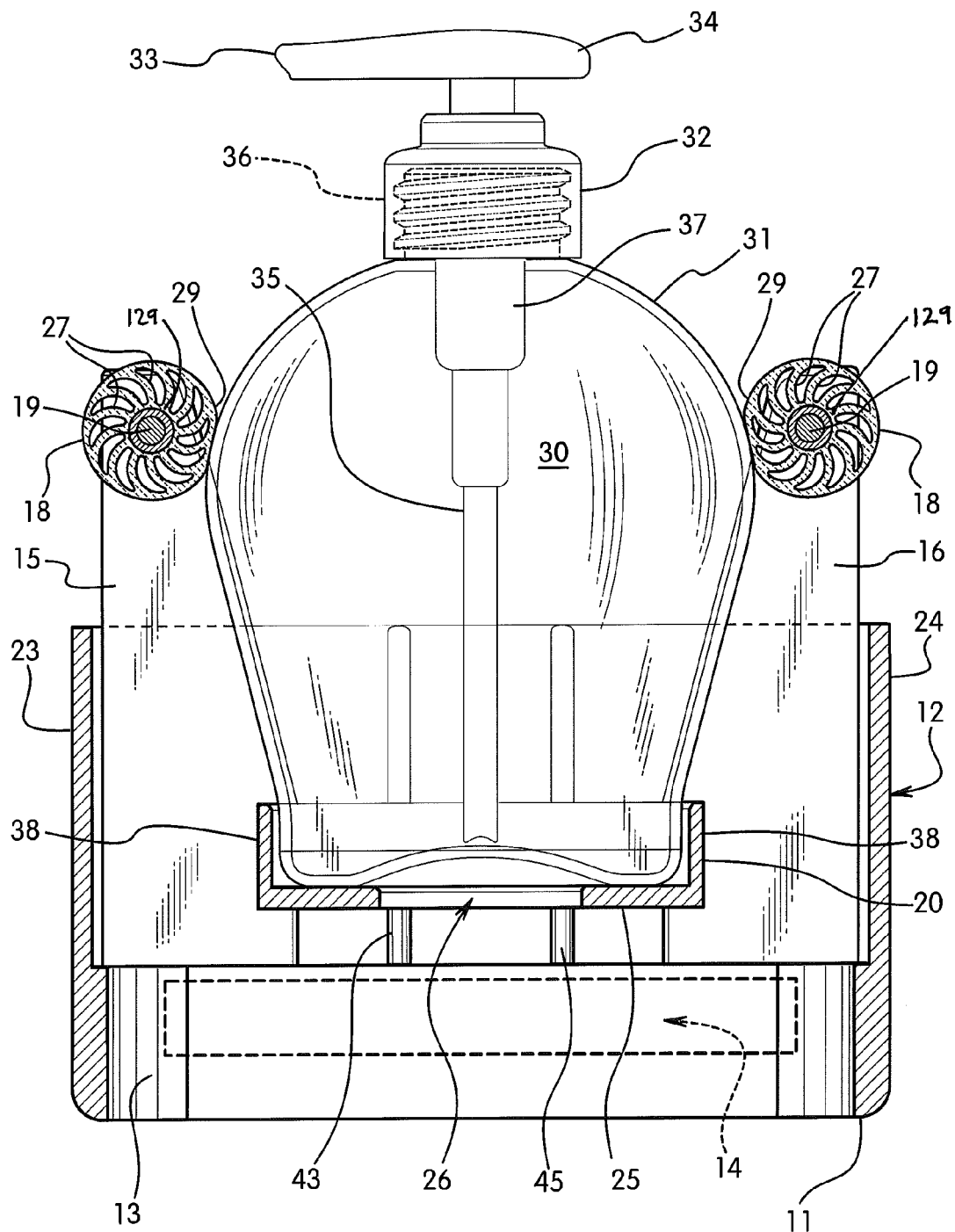
FIG. 4 is a cross-sectional view of the holder of FIG. 1 along line 4-4 of FIG. 3, the base portion showing part of the inner structure.
Figure 5:
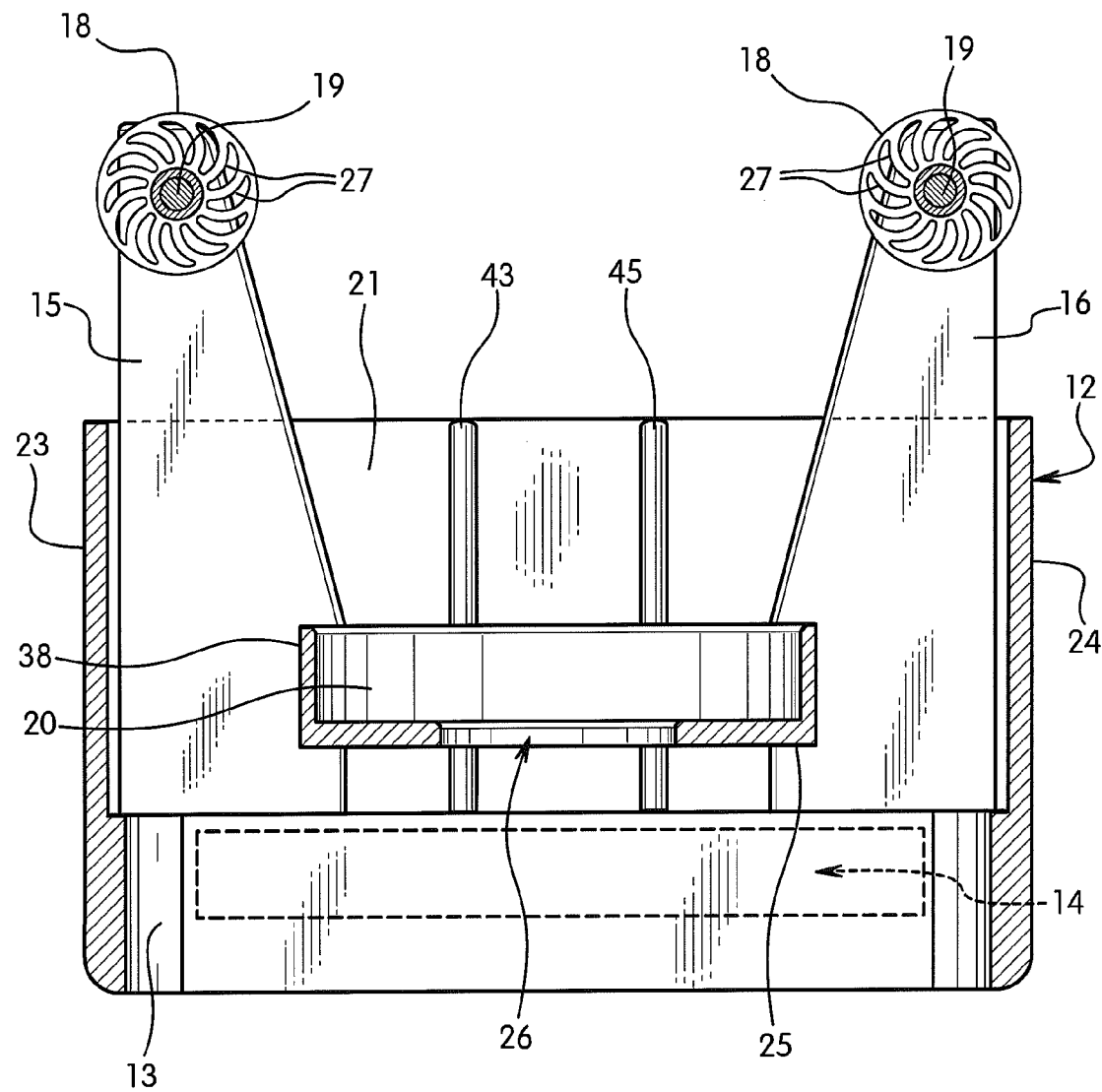
FIG. 5 is a cross-sectional view of the holder of FIG. 4 without the container.

FIG. 4 is a front cross-sectional view of the holder 10 and container 30. FIG. 5 is the same cross-sectional view but without the container 30. The container 30 has the same components as in FIG. 1 and will not be described in detail with regard to this view. The holder cup 20 has a bottom wall 25 with an aperture 26 to assist in unloading the container from the holder. During such an unloading step, an ejection pin (not shown) moves up through the aperture 26 to contact the container 30 and move the container 30 upwards. The rollers 18 are shown as having a plurality of channels 27. The channels 27 extend substantially radially outwardly, the channels preferably being arcuate and arranged in a spiral configuration, from a radially central part 129 of the roller 18 adjacent to the axle 19 to an outer circumferential surface 29 of the roller 18. These channels 27 function to increase the degree of compression, in a substantially radial direction, of the roller 18 during contact with the container wall 31. In this view, the surface 29 of the rollers 18 is shown as compressed against the container surface 31. The structure of the base portion 12 is described in detail in the description of the prior Figures. It has a first side wall 23 and a second side wall 24. There is a slot 14 for interaction with a processing line structure. Vertical supports 43 and 45 reinforce the front wall 22 and rear wall 21.

Figure 6:
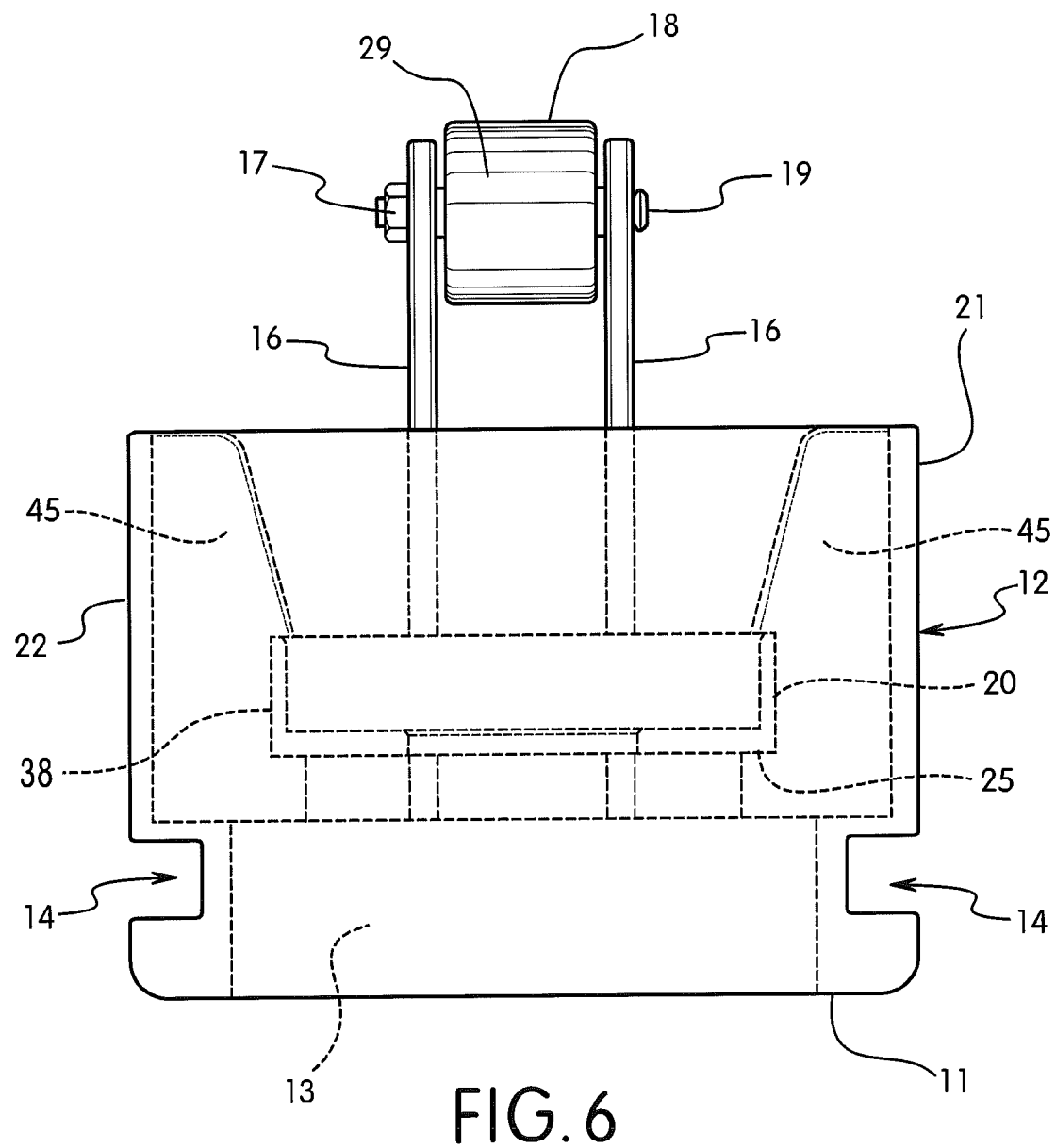
FIG. 6 is a right side view of the holder of FIG. 4, the base portion showing part of the inner structure.

FIG. 6 is a right side view of the holder 10 with the container 30 removed. The base portion 12 is shown with lower part 13 with slot 14 for interaction with the processing line. Shown is the front wall 22, the rear wall 21 and the holder cup 20 with bottom wall 25. Also shown are vertical reinforcing supports 43, 45. The roller 18 has a surface 29 and is mounted to arm 16 by axle 19 and fastener 17.

Figure 7:
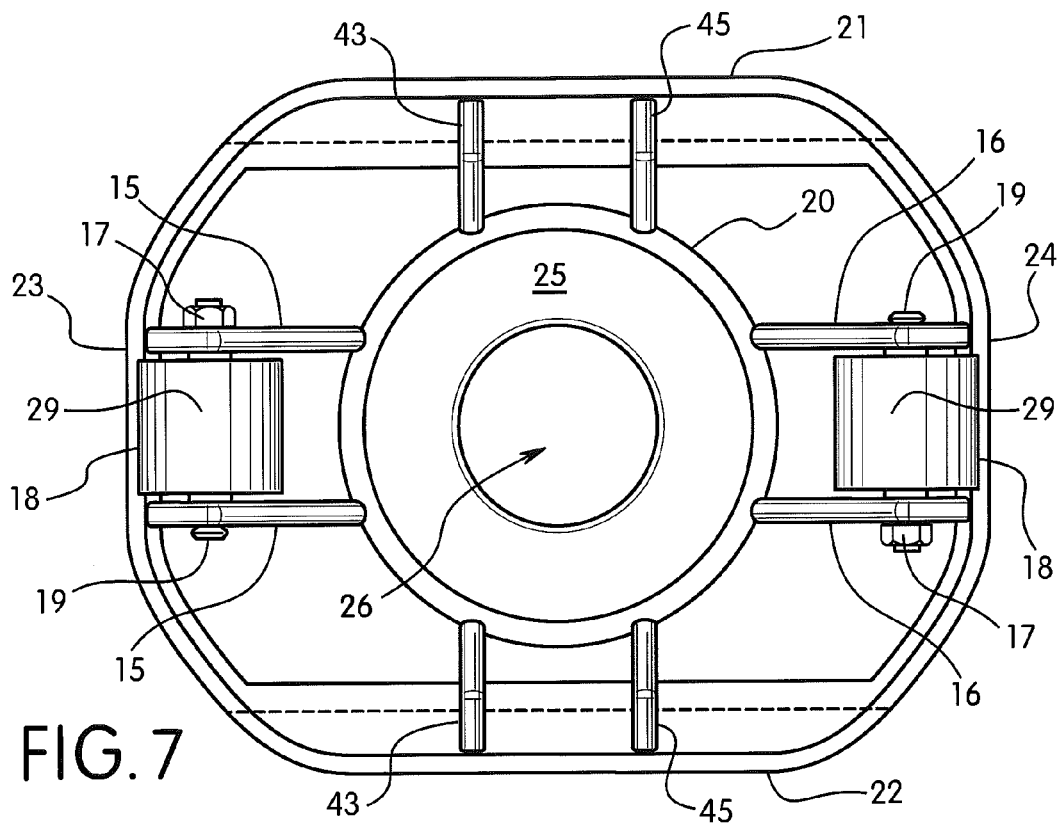
FIG. 7 is a top plan view of the holder of FIG. 1 without the container.
Figure 8:
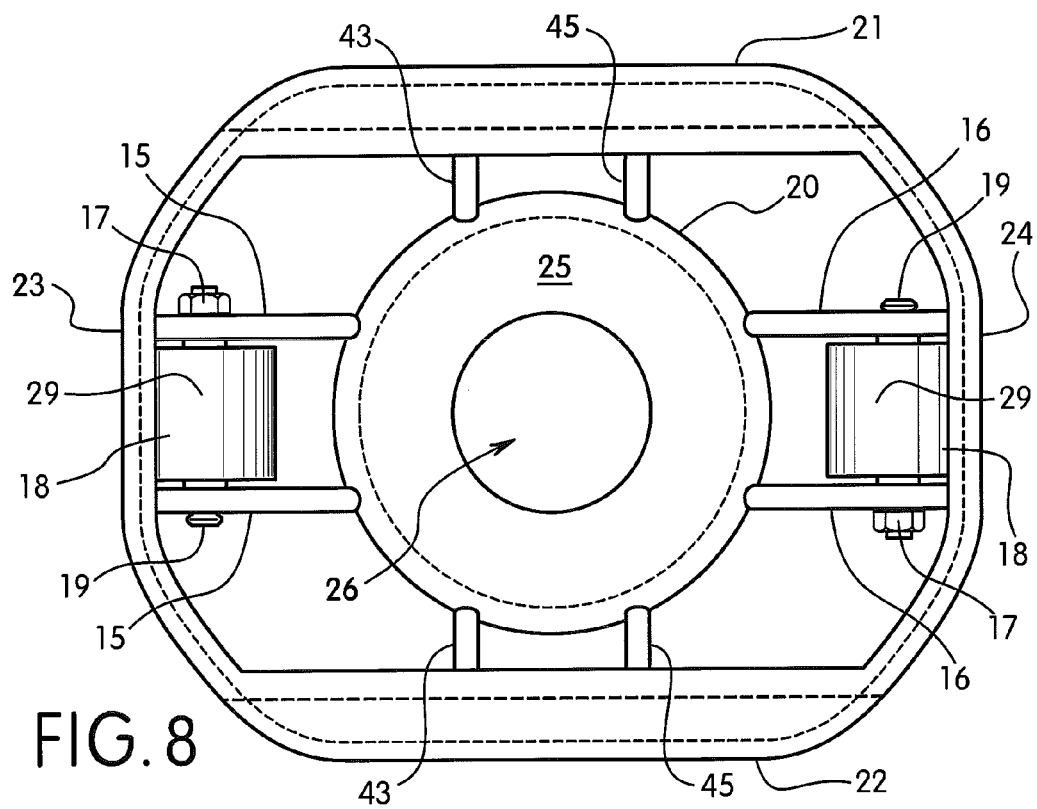
FIG. 8 is a bottom plan view of the holder of FIG. 1 without the container.

FIGS. 7 and 8 are top and bottom plan views respectively of the base portion 12. In each view there is shown front wall 22, rear wall 21, first side wall 23 and second side wall 24. Holder cup 20 is shown with bottom wall 25 which has an aperture 26. The holder cup 20 is supported by inwardly located ends of lower portions of the reinforcing supports 43, 45 and of the arms 15, 16. The rollers 18 are supported by arms 15 and 16. The rollers have a surface 29 which will contact the container surface 31. The rollers rotate on axle 19 which has a fastener 17 to attach it to an arm 15 or 16.

Figure 9:
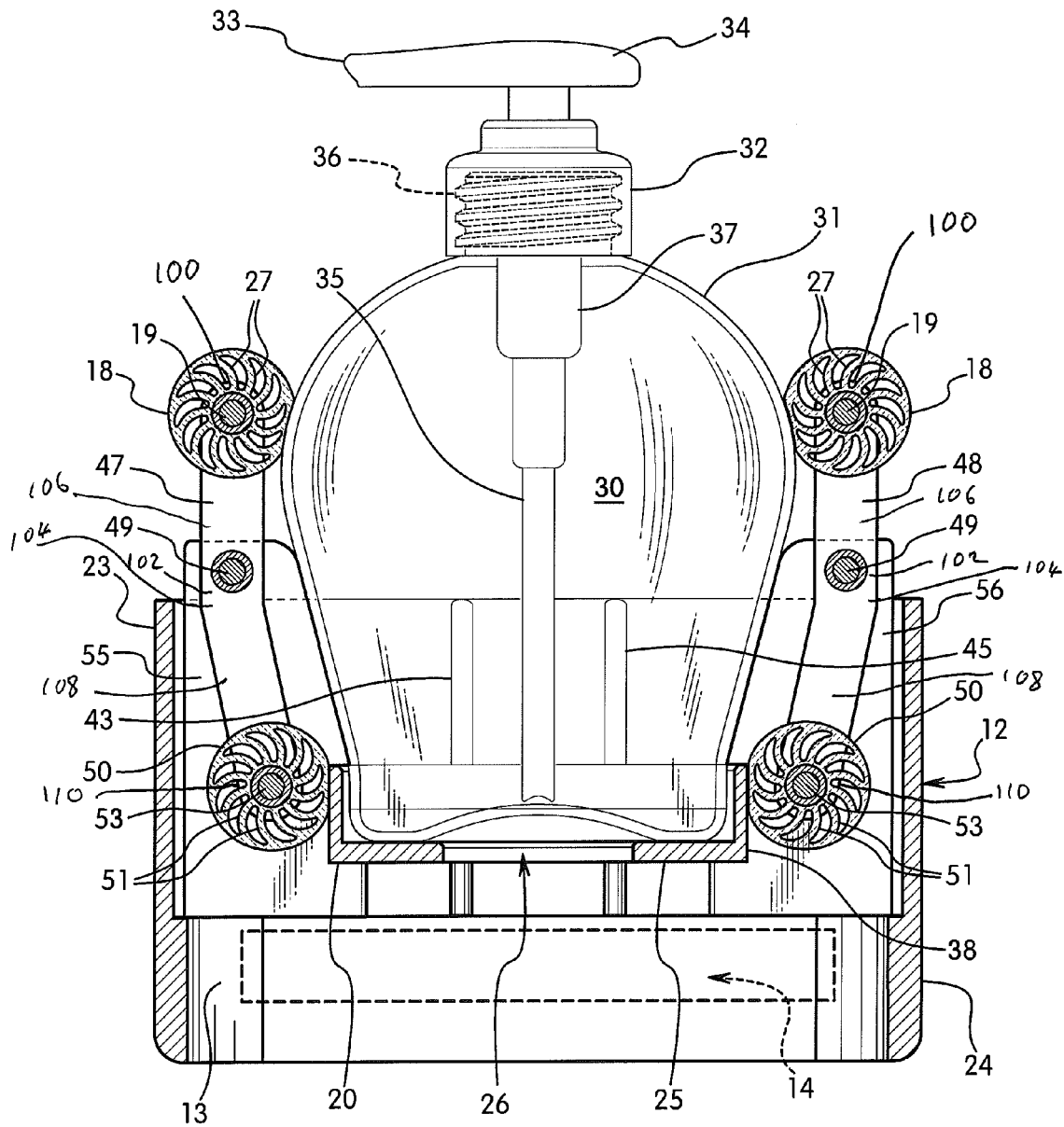
FIG. 9 is a front elevation view of an orienting holder according to a second embodiment of the present invention, the holder being shown in combination with a container, the base portion in section showing part of the inner structure of the holder, the arms holding the compressible rollers being pivotally adjustable.
Figure 10:
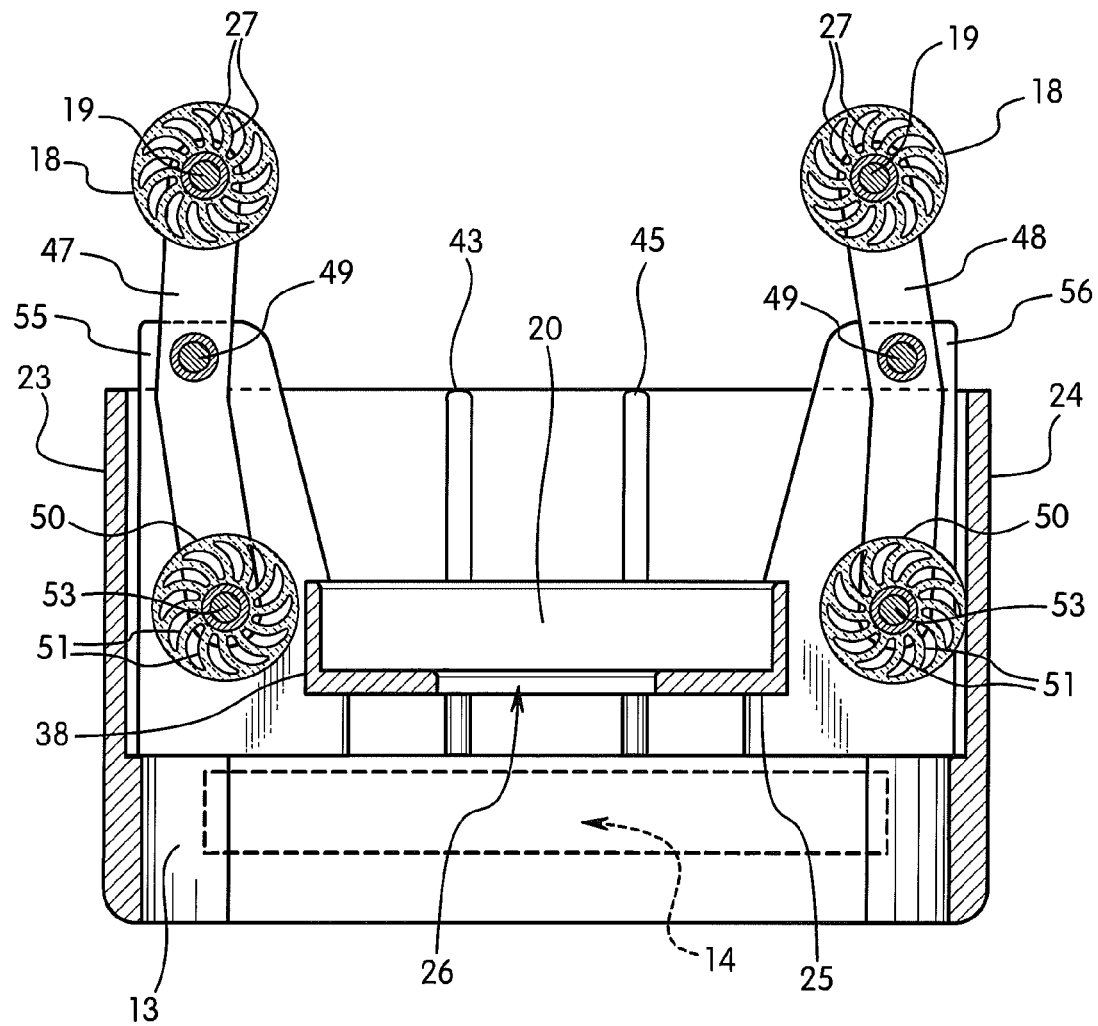
FIG. 10 is a cross-sectional view of the holder of FIG. 10 along line 11-11 of FIG. 10 without the container, the base portion showing part of the inner structure.

FIGS. 9 and 10 are elevation views, in partial section, showing an additional embodiment of the orienting holder of the invention.

FIG. 9 shows the embodiment of the orienting holder 10 with a container 30 and FIG. 10 without the container 30. In this embodiment the rollers 18 are not in a fixed relationship relative to the base portion 12, and consequently to the container 30 when in use, but rather are movable relative to the base portion 12 and the container 30. The rollers 18 also are adjustable relative to the container 30.

The base portion 12 is similar to that for the embodiment of FIGS. 1 to 8. The difference primarily is in the structure for holding the rollers 18. The base portion 12 has first and second side walls 23 and 24 respectively. The lower part 13 has slot 14 for interaction with the processing line. The holder cup 20 has side wall 38 and lower wall 25 with aperture 26.

Vertical supports 43 and 45 reinforce front wall 22 and rear wall 21. In this embodiment, the rollers 18 have the same construction as described for the first embodiment of FIGS. 1 to 8.

The rollers 18 are attached to movable arms 47 and 48, each being mounted at a respective opposite side of the base portion 12, adjacent to and inwardly of a respective side wall 23, 24. The rollers 18 constitute upper rollers 18 and are attached to respective upper ends 100 of arms 47 and 48 by axles 19 and fasteners 17. The arms 47 and 48 pivot on fasteners 49, a central part 102 of each arm 47, 48 being mounted to a respective fastener 49 which constitutes a pivot mount for the respective arm 47, 48. Each fastener 49 is located substantially at an elbow 104 of the respective arm 47, 48, the elbow 104 being the junction of upper and lower portions 106, 108 of the arm 47, 48. The concave side of the elbow 104 is directed inwardly from the respective side wall 23, 24, and oriented towards the container 30 in use. Pivoting arm 47 is attached to support brace 55 by fastener 49, support brace 55 being disposed at the inner surface of first side wall 23. Pivoting arm 48 is attached to support brace 56 by another fastener 49, support brace 56 being disposed at the inner surface of second side wall 24. The lower end 110 of each arm 47, 48 has mounted thereon a respective lower roller 50. The lower roller 50 is rotationally supported on an axle 53. Each upper roller 18 is mounted at a common first height above the base portion 12 and each lower roller 50 is mounted at a common second height above the base portion 12.

The lower roller 50 in this embodiment has the same construction as that of the upper roller 18, in particular is compressible and provided with a plurality of substantially radially directed channels 51, which are arcuate and spirally arranged. The arms 47, 48, each carrying a respective upper and lower roller 18, 50 pair, can pivot about fastener 49 so that the upper and lower rollers 18, 50 can move in the same rotational direction but opposite translational directions with respect to the respective side wall 23, 24, and the container 30 in use. The upper roller 18 can contact an upper surface of the container 30 while the lower roller 50 contacts a lower surface of the container 30 and/or the exterior surface 38 of holder cup 20. In this way, by providing pairs of upper and lower rollers on opposite sides of the container to be held, some variations in the shape of the containers 30 can be accommodated by the same orienting holder 10. Also, the container 30 is more securely held within the orienting holder 10.

Figure 11:
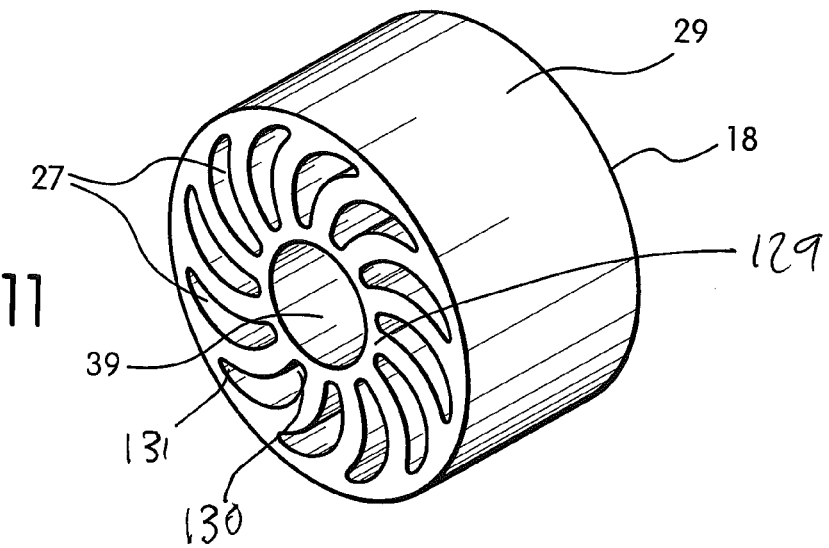
FIG. 11 is s perspective view of a first compressible roller with channels for use in any of the embodiments of the orienting holder of the present invention.
Figure 12:
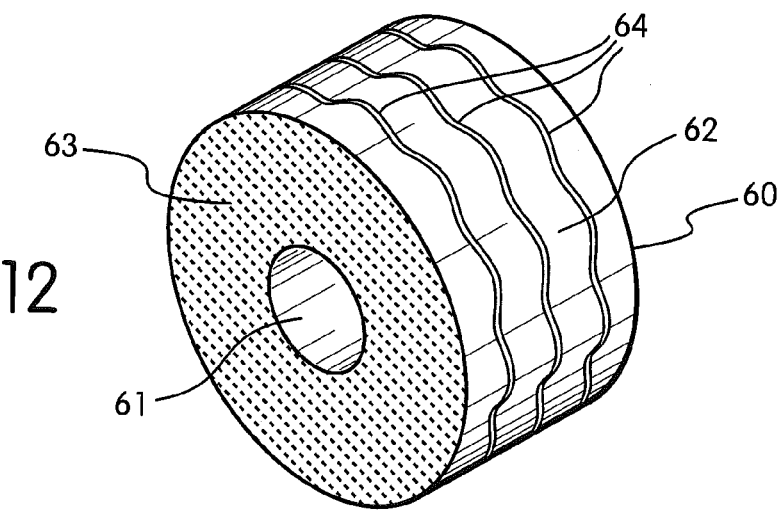
FIG. 12 is a perspective view of a second alternative compressible roller with an enhanced gripping surface for use in any of the embodiments of the orienting holder of the present invention.
Figure 13:
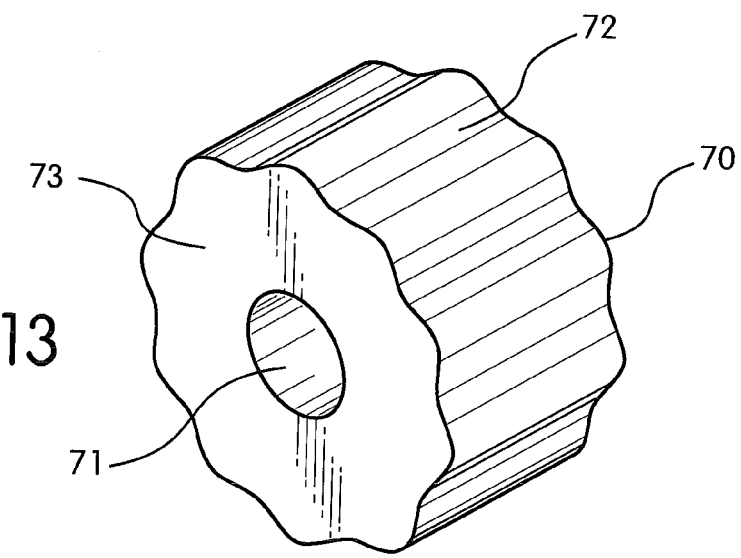
FIG. 13 is a perspective view of a third alternative compressible roller with an enhanced gripping surface for use in any of the embodiments of the orienting holder of the present invention.

FIGS. 11 to 13 show three respective alternative constructions for the rollers 18, 50 for use in the embodiments of the present invention. The various roller constructions described may be used independently or in any combination, either for the opposite sides of the orienting holder and/or for the upper and lower rollers.

FIG. 11 is an enlarged view of the compressible roller 18 of the embodiment of FIGS. 1 to 8. The same construction may be provided for upper and lower rollers 18, 50 of the embodiment of FIGS. 9 and 10. The roller 18 has a central shaft opening 39 for an axle. There is a peripheral circumferential outer surface 29. The outer surface 29 and the axle opening 39 are circular in cross-section. A plurality of spirally arranged arcuate channels 27 is provided in the roller, each extending between opposed inner and outer channel ends 130, 131 from the radially central part 129 to the circumferential outer surface 29 of the roller 18. Each channel 27 has a longitudinal direction extending in an axial direction through the roller 18. The substantially radially oriented channels 27 enhance the compressibility of the roller 18 when the outer surface 29 is compressed, for example by contact with the outer surface of the container 30 in a substantially radial direction. The roller 18 can also rotate in order to more readily be deformed by compression when rolled against the container surface when the container 30 is inserted into or removed from the orienting holder 10.

FIG. 12 illustrates an alternate roller to that of FIG. 11. This roller 60 is a solid roller composed of an elastic and compressible material which is not provided with channels. Roller 60 has a central opening 61 for an axle (not shown). The roller 60 has a continuous region 63 between the opening 61 and the peripheral surface 62. The peripheral surface 62 may have, as illustrated, an irregular three-dimensional relief profile 64 on at least a part of the surface 62. The relief profile 64 may comprise ridges and/or grooves, typically extending circumferentially around the surface 62, so that the surface 62 may resemble that of a vehicle tire. This relief profiling can enhance the gripping of a container 30 by the roller 60 as the container 30 is inserted into or removed from the holder 10.

FIG. 13 illustrates a further alternate roller. The roller 70 is again solid, as the roller of FIG. 12, and has a continuous region 73 between the axle opening 71 and the peripheral surface 72. The peripheral surface 72 has an undulating surface with hills and valleys, the undulations being oriented in an axial direction of the roller 70. This likewise can enhance the gripping of a container 30 by the roller 70 as the container 30 is inserted into or removed from the holder 10.

The rollers 18, 50, 60, 70 are elastic and are composed of an elastic material such as an elastomer, for example a polymeric foam. The polymeric foam may be an open cell or closed cell foam. Categories of elastomers are compressible to varying degrees depending on their stiffness. The rollers 18, 50, 60, 70 preferably exhibit at least some compressible deformation at the point of contact with the container 30, or the holder cup 20 for the lower roller 50, in order to better hold the container 30 and to accommodate variations in container shapes. The rollers 18, 50, 60, 70 regain their original shape upon the removal of the deforming force since they are composed of elastically deformable material.

The elastomer may form a solid body, with or without pores, and may contain additives to adjust the elasticity. Elastomeric polymers that are useful for the rollers include natural and synthetic rubbers, ethylene polymers and copolymers, propylene polymers and copolymers, and butylene polymers and copolymers. Elastomeric polymers, in particular suitable for forming foams, are well known to those skilled in the art. Useful elastomeric foams are polyurethane foams, ethylene-vinyl acetate foams, and expanded polyethylene foams and expanded polypropylene foams. Closed cell foams are preferred since they are more easily maintained in processing operations because there are no open cells to absorb contaminants or liquid debris. Durable elastomer materials, such as polyurethanes, are generally preferred. Such materials have good wear resistant properties while retaining compressibility. This results in less processing line maintenance. Elastic materials further have the advantage that they can automatically adjust to imperfections in a container surface.

Depending on the degree of the imperfections rollers composed of a solid elastomer or a foam elastomer may be sufficient to effectively hold the container in the set orientation. However, where the imperfections can be more significant, elastomers with channels may be preferred since they will more readily conform into the imperfections to grip and hold the container in the set orientation. The channels can be of essentially any shape and size. The selected shape and size depend on the particular elastomer and the degree of compressibility desired. The objective in the use of channels is to increase the compressibility of elastomers, such as durable elastomers. Channels can also be used with foam elastomers.

As a result rollers can be chosen for a particular container shape. Thus the holders are versatile and can be used for differing container shapes through the selection of the best rollers for a container.

The rollers preferably have a stiffness factor of about 0.8N to about 80N per 4 mm deflection, and preferably about 3N to about 18N per 4 mm deflection (N=Newtons). The stiffness factor is determined using an Instron test machine, such as an Instron 4301. The rollers with the axles in place are placed between two flat plates. The upper plate is attached to the head of the Instron test machine and is lowered at a rate of 12.7 mm per minute for a distance of 4 mm. The surface a roller is deflected against each surface. The deflection force required is indicated directly by the Instron test machine.

In the use of the holder 10 there are a plurality of these holders 10 fitted onto a container processing line, such as a container filling line. While the line is operating continuously, the empty containers to be filled are inserted into the holders. The containers are inserted into the holders in a set orientation. It is important that the containers retain this orientation through the container filling step until removal of the containers from the filling line. The rollers allow for the containers to be readily inserted into the holders and to be removed from the holders. Without the rolling action, the force required to insert the container into the holder would be greater than it is with the rolling action. The rollers rotate to provide for the easy inserting and removal of the containers. By being comprised of an elastic material, the roller can grip onto the container surface to an extent to maintain the container in the designated orientation. The container cannot rotate as the holder carrying the container moves along the filler line. The grip of the rollers onto the containers is sufficient to insure that the initial container orientation is maintained throughout the filling process, and any preliminary or subsequent processing steps, prior to removal of the container from the processing line.

What is claimed is:

1. An orienting holder for holding a container in a particular orientation on a container processing line, the orienting holder comprising:
    a unit having a horizontal base portion including a holder cup comprising a vertical side wall and a horizontal lower wall, the holder cup being configured to receive the container disposed thereon in a vertical orientation; and
    a cavity directly above the holder cup;
    a first roller;
    a second roller;
    a first side wall extending vertically above the holder cup;
    a second side wall extending vertically above the holder cup;
    a first arm attached to an inner surface of the first side wall and extending vertically above the first side wall; and
    a second arm attached to an inner surface of the second side wall and extending vertically above the second side wall, wherein:
        the first arm supports the first roller inwardly of the first side wall; and
        the second arm supports the second roller inwardly of the second side wall;
        the first roller and the second roller are located around the cavity;
        the first roller and the second roller maintain the container on the horizontal base portion in the vertical orientation by engaging an exterior surface of the container received within the cavity; and
        the first roller and the second roller rotate on horizontal axes.

2. The orienting holder of claim 1, wherein the first roller and the second roller are comprised of an elastic material.

3. The orienting holder of claim 2, wherein at least one of the first roller and the second roller is comprised of an elastomer.

4. The orienting holder of claim 3, wherein the elastomer is comprised of a polyurethane.

5. The orienting holder of claim 3, wherein the elastomer is comprised of a polymeric foam.

6. The orienting holder of claim 2, wherein the elastic material has a stiffness factor of 0.8 N to 80N per 4 mm deflection.

7. The orienting holder of claim 6, wherein the elastic material has a stiffness factor of 3N to 18N per 4 mm deflection.

8. The orienting holder of claim 1, wherein at least one of the first roller and the second roller has a plurality of substantially radially oriented channels.

9. The orienting holder of claim 1, wherein an outer circumferential surface of at least one of the first roller and the second roller has an enhanced gripping surface.

10. The orienting holder of claim 9, wherein the enhanced gripping surface comprises a three-dimensional relief profile on at least a part of the outer circumferential surface.

11. The orienting holder of claim 10, wherein the three-dimensional relief profile comprises at least one of a circumferential ridge and a circumferential groove extending around the outer circumferential surface.

12. The orienting holder of claim 9, wherein the enhanced gripping surface comprises surface undulations, the undulations being oriented in an axial direction of the roller.

13. The orienting holder of claim 1, wherein the first roller and the second roller are respectively mounted on an upper end of the first arm and an upper end of the second arm.

14. The orienting holder of claim 13, wherein each of the first roller and the second roller is mounted at a position adapted to permit the roller to contact an upper portion of the container disposed on the horizontal base portion.

15. The orienting holder of claim 13, wherein:
    the first arm and the second arm are rigid; and
    the first roller and the second roller are compressible.

16. The orienting holder of claim 13, wherein:
    the first arm and the second arm are flexible; and
    the first roller and the second roller are compressible.

17. The orienting holder of claim 1, wherein:
    each of the first arm and the second arm has a lower roller mounted at a lower end thereof, and
    a central part of each of the first arm and the second arm is pivotally mounted.

18. The orienting holder of claim 17, wherein the central part includes an elbow, a concave side of the elbow being directed toward the cavity.

19. The orienting holder of claim 17, wherein the each of the first roller and the second roller is mounted at a position adapted to contact an upper portion of the container disposed on the base portion and each lower roller is mounted at a position adapted to permit the lower roller to contact a lower portion of the container disposed on the base portion.

20. The orienting holder of claim 17, wherein each of the first roller and the second roller is mounted at a common first height above the base portion and each lower roller is mounted at a common second height above the base portion.

21. The orienting holder of claim 1 wherein the at least two positions located around the cavity comprise positions on opposite sides of the cavity.

22. The orienting holder of claim 1, wherein the at least two positions located around the cavity are positioned so that the first roller and the second roller at least partly surround the cavity and temporarily capture the container disposed therein.

23. The orienting holder of claim 22, wherein the the first roller and the second roller are adapted to provide an inwardly and downwardly oriented holding force on the container disposed in the cavity.

24. The orienting holder of claim 1, wherein there is a structure on the horizontal base portion adapted to interact with the container processing line.

25. The orienting holder of claim 24, wherein the structure defines forward and rearward ends of the unit, and the at least two positions located around the cavity comprise positions on opposite sides of the unit, the sides extending between the forward and rearward ends.

26. The orienting holder of claim 1, wherein the container is in an upright orientation relative to the orienting holder when in the vertical orientation relative to the horizontal base portion.

27. A container processing line comprising:
a series of orienting holders, wherein one or more of the orienting holders in the series comprises:
a unit having a horizontal base portion including a holder cup comprising a vertical side wall and a horizontal lower wall, the holder cup being configured to receive a container disposed thereon in a vertical orientation;
a cavity directly above the holder cup;
a first roller;
a second roller;
a first side wall extending vertically above the holder cup;
a second side wall extending vertically above the holder cup;
a first arm attached to an inner surface of the first side wall and extending vertically above the first side wall; and
a second arm attached to an inner surface of the second side wall and extending vertically above the second side wall,
wherein:
the first arm supports the first roller inwardly of the first side wall; and
the second arm supports the second roller inwardly of the second side wall;
the first roller and the second roller are located around the cavity;
the first roller and the second roller maintain the container in the vertical orientation and that prevent rotation of the container by engaging an exterior surface of the container received within the cavity, and
the first roller and the second roller rotate on horizontal axes.

28. The orienting holder of claim 1, wherein the first roller and the second roller prevent rotation of the container as the orienting holder moves on the container processing line by engaging the exterior surface of the container.

29. The orienting holder of claim 1, wherein:
the first roller and the second roller are disposed on directly opposite sides of the base; and
the first roller and the second roller are the only rollers included in the orienting holder.

30. The orienting holder of claim 1, wherein:
the first arm reinforces the first side wall;
the second arm reinforces the second side wall.

31. The orienting holder of claim 1, further comprising a slot for maintaining the orienting holder on a processing line, wherein the slot interacts with a projection on the processing line to maintain the orienting holder on the processing line.

32. The orienting holder of claim 1, wherein at least one of the first roller and the second roller has a plurality of substantially arcuate channels arranged in a spiral configuration from a radially central part of each of the first roller and the second roller to an outer circumference of each of the first roller and the second roller.

* * * * *